United States Patent
Okada et al.

(10) Patent No.: US 7,604,558 B2
(45) Date of Patent: Oct. 20, 2009

(54) AUTOMATIC TRANSMISSION WITH LUBRICATING STRUCTURE

(75) Inventors: Naoya Okada, Anjo (JP); Katsuhisa Ishii, Aichiken (JP); Minoru Todo, Takahoma (JP); Hirofumi Ota, Toyota (JP); Kazutoshi Nozaki, Aichiken (JP); Atsushi Honda, Aichiken (JP)

(73) Assignees: Aisin A W Co., Ltd. (JP); Toyota Jidosha Kabushiki Kaisha (JP)

( * ) Notice: Subject to any disclaimer, the term of this patent is extended or adjusted under 35 U.S.C. 154(b) by 257 days.

(21) Appl. No.: 11/600,053

(22) Filed: Nov. 16, 2006

(65) Prior Publication Data

US 2007/0149337 A1 Jun. 28, 2007

(30) Foreign Application Priority Data

| Nov. 17, 2005 | (JP) | ............................. 2005-333338 |
| Nov. 17, 2005 | (JP) | ............................. 2005-333383 |
| Nov. 17, 2005 | (JP) | ............................. 2005-333385 |
| Nov. 17, 2005 | (JP) | ............................. 2005-333442 |

(51) Int. Cl.
F16H 57/04 (2006.01)
F16D 13/00 (2006.01)
(52) U.S. Cl. .................... 475/159; 184/6.12; 192/113.3
(58) Field of Classification Search ................. 475/159; 184/6.12, 6.27; 192/113.1, 113.3, 113.34, 192/113.35
See application file for complete search history.

(56) References Cited

U.S. PATENT DOCUMENTS

| 5,791,193 | A | * | 8/1998 | Uematsu et al. ................ 74/467 |
| 6,059,682 | A | * | 5/2000 | Friedmann et al. .......... 475/159 |
| 6,499,578 | B1 | * | 12/2002 | Kundermann et al. ..... 192/87.11 |
| 6,547,686 | B1 | * | 4/2003 | Thorenz ...................... 475/159 |
| 6,662,904 | B2 | * | 12/2003 | Omote et al. ................ 184/6.2 |
| 7,232,022 | B2 | | 6/2007 | Aoki | |

FOREIGN PATENT DOCUMENTS

| JP | 2-093152 | 4/1990 |
| JP | 2-129457 | 5/1990 |
| JP | 5-039866 | 2/1993 |

* cited by examiner

Primary Examiner—Roger Pang
(74) Attorney, Agent, or Firm—Bacon & Thomas, PLLC

(57) ABSTRACT

A piston operating a first clutch is disposed between a first drum accommodating the first clutch and a second drum accommodating a second clutch, and an oil reservoir storing lubricating oil that has lubricated the first clutch is provided on an inner cylindrical surface of a skirt portion of the piston. Barriers having different inner diameters are provided to the axial front and rear of the oil reservoir. When the second clutch is disengaged such that the amount of lubricating oil supplied to the oil reservoir increases, the lubricating oil overflows the barrier having the smaller inner diameter, and thus flows to the second clutch.

11 Claims, 4 Drawing Sheets

|  | C-1 | C-2 | C-3 | C-4 | B-1 | B-2 | F-1 |
|---|---|---|---|---|---|---|---|
| P |  |  |  |  |  |  |  |
| REV1 |  |  | O |  |  | O |  |
| REV2 |  |  |  | O |  | O |  |
| N |  |  |  |  |  |  |  |
| 1ST | O |  |  |  |  | (O) | O |
| 2ND | O |  |  |  | O |  |  |
| 3RD | O |  | O |  |  |  |  |
| 4TH | O |  |  | O |  |  |  |
| 5TH | O | O |  |  |  |  |  |
| 6TH |  | O |  | O |  |  |  |
| 7TH |  | O | O |  |  |  |  |
| 8TH |  | O |  |  | O |  |  |

AUTOMATIC TRANSMISSION WITH LUBRICATING STRUCTURE

INCORPORATION BY REFERENCE

The disclosure of Japanese Patent Application No. 2005-333442 filed on Nov. 17, 2005, including the specification, drawings and abstract is incorporated herein by reference in its entirety.

BACKGROUND OF THE INVENTION

1. Field of the Invention

The present invention relates to a lubricating device in an automatic transmission which is capable of supplying lubricating oil accurately in accordance with the engagement state of a plurality of clutches within the automatic transmission.

2. Description of the Related Art

One type of conventional automatic transmission has a speed change mechanism for shifting the rotation of an input shaft between a plurality of speeds by selectively connecting a speed reducing planetary gear set for reducing the rotational speed of the input shaft and for transferring rotation at the reduced speed to each element of a planetary gear set including a plurality of planetary gear subsets, via a plurality of clutches and brakes. A first clutch is disposed within a first drum having a closed-end cylindrical shape, and a second clutch is disposed within a second drum which has a closed-end cylindrical shape and which is mounted inside the first drum.

When the first and second clutches are engaged, the amount of heat generated increases. Therefore, lubricating oil is typically supplied by centrifugal force in a radial direction from a lubricant supply passage provided in the input shaft for lubrication of the friction engagement elements of the clutches and brakes, the meshing portions of the planetary gears, and various bearings.

In the above-described type of automatic transmission, the amount of heat generated varies greatly depending on whether the clutch is engaged or disengaged, but conventionally, a constant amount of lubricating oil is supplied at all times, irrespective of the state of engagement. Hence in certain cases, although the overall flow rate of the lubricating oil that is supplied through the supply passage is sufficient, the amount of lubricating oil supplied to specific locations where a large amount of heat is generated may be deficient.

To address the above-described problem, the overall flow rate of the lubricating oil may be increased responsive to an increase in the amount of heat generated as a reference, but since the amount of heat generated by a frictional engagement element varies according to its state of engagement and its rotational speed, the result may be supply of an appropriate amount of to the specific locations where a large amount of heat is currently generated, but supply of an excessive amount of oil to other locations.

SUMMARY OF THE INVENTION

The present invention is applicable to an automatic transmission in which a first clutch and a second clutch are never engaged simultaneously, and has as its object provision of lubricating structure in an automatic transmission, which structure allocates lubricating oil accurately in accordance with the state of engagement of the clutches and without increasing the overall supply flow rate of the lubricating oil.

The lubricating device according to a first aspect of the present invention is structured such that an oil reservoir, in which barriers having different inner diameters are disposed to the front and rear of the axial direction thereof, is provided on the inner periphery of a piston, and thus, when a second clutch is disengaged such that a large amount of oil is supplied to the oil reservoir, the lubricating oil overflows a first barrier having a small inner diameter such that lubricating oil can be allocated to a first clutch. As a result, lubricating oil can be distributed appropriately to the first clutch in accordance with the state of engagement of the second clutch without increasing the overall lubricating oil supply rate.

The lubricating device according to a second aspect of the present invention is structured such that at normal times, the lubricating oil stored in the oil reservoir is supplied to a brake from a second barrier having a large inner diameter via an opening portion formed in the piston and a first drum. Hence, when the first clutch does not require a large amount of lubricating oil, the lubricating oil supply to the opening portion is prioritized such that no more than the required amount of lubricating oil is ever supplied to the first clutch.

According to a third aspect of the present invention, in a predetermined low shift speed at which a comparatively large amount of heat is generated, the second clutch is disengaged, and hence a sufficient amount of lubricating oil can be supplied to the first clutch, while in a predetermined high shift speed at which a comparatively small amount of heat is generated, the first clutch is supplied with a significantly lesser amount, i.e. only the required amount of lubricating oil.

According to a fourth aspect of the present invention, lubricating oil, having lubricated a pinion gear and a ring gear of a planetary gear set, is supplied to the first clutch, and thus a sufficient amount of lubricating oil can be supplied to the first clutch even when the second clutch is engaged.

DETAILED DESCRIPTION OF THE PREFERRED EMBODIMENT

Figures 1, 2:
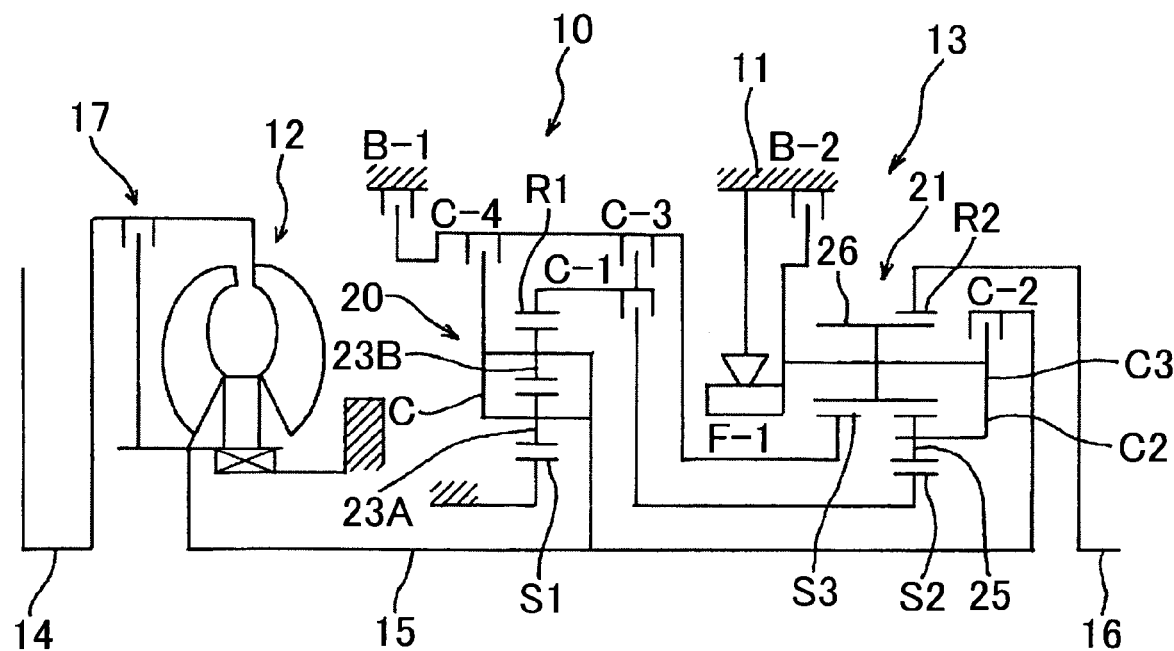
FIG. 1 is a skeletal diagram of an automatic transmission according to the present invention.
FIG. 2 is a table of the engagement states of brakes and clutches in each gear speed of the automatic transmission shown in FIG. 1.

An embodiment of the present invention will be described here with reference to the accompanying drawings. FIG. 1 shows an automatic transmission 10 which can be used favorably in a front wheel or rear wheel drive type vehicle, for example. The automatic transmission 10 includes a torque converter 12 and a speed change mechanism 13, both housed in a transmission case 11 attached to the vehicle body. Output from the engine is input into an input shaft 15 of the automatic transmission 10 via a pump impeller and a turbine of the torque converter 12. The speed change mechanism 13 changes the speed of rotation input from the input shaft 15 and outputs the rotation as changed at an output shaft 16 connected to a driven wheel. The torque converter 12 is provided with a lock-up clutch 17. Further, the input shaft 15 and output shaft 16 of the automatic transmission 10 are coaxial and aligned front to back in the vehicle, i.e. in the direction of forward travel of the vehicle. The torque converter 12 is disposed on the front side of the vehicle, while the output shaft 16 is disposed to the rear of the vehicle. Thus, in the description of this embodiment, the torque converter 12 axial end of the automatic transmission 10 is referred to as the "front", while the output shaft 16 end is referred to as the "rear".

The speed change mechanism 13 includes the input shaft 15, a speed reducing planetary gear set 20, a planetary gear set 21 including a plurality of planetary gear subsets, the output shaft 16, first through fourth clutches C-1 to C-4, and first and second brakes B-1, B-2, which are arranged in series coaxially with the central axis of the transmission case 11.

The speed reducing planetary gear set 20, which reduces the rotational speed of the input shaft 15 and transfers the rotation to a reduced speed rotary member, includes a sun gear S1 which is fixed to the transmission case 11 at all times and therefore rotationally restricted, a carrier C1 which is directly coupled to the input shaft 15, a first pinion 23A which is supported by the carrier C1 and meshes with the sun gear S1, a second pinion 23B which is supported by the carrier C1 and meshes with the first pinion 23A, and a ring gear R1 which meshes with the second pinion 23B.

The planetary gear set 21 is a Ravigneaux type gear set combining a single pinion planetary gear subset and a double pinion planetary gear subset, for example.

A small diameter first sun gear S2 of the planetary gear set 21 is selectively engaged with the ring gear R1 of the speed reducing planetary gear set 20 by the first clutch C-1. A large diameter second sun gear S3 is selectively engaged with the ring gear R1 of the speed reducing planetary gear set 20 by the third clutch C-3, and selectively connected to the input shaft 15 via the carrier C1 of the speed reducing planetary gear set 20 by the fourth clutch C-4. A short pinion 25 meshes with the first sun gear S2. A long pinion 26 meshes with the second sun gear S3 and the short pinion 25. The short pinion 25 and long pinion 26 are each rotatably supported by directly coupled carriers C2, C3. A ring gear R2 meshes with the long pinion 26 and is connected to the output shaft 16 to serve as an output element.

The second sun gear S3 is selectively engaged with the transmission case 11 by the first brake B-1. The carrier C2 (C3) is selectively engaged with the input shaft 15 by the second clutch C-2. The carrier C2 (C3) is also selectively engaged with the transmission case 11 by the second brake B-2, and can be limited to rotation in one direction by a one-way clutch F-1.

The automatic transmission 10 as described above is capable of establishing gear ratios for eight forward speeds and two reverse speeds by selectively engaging and disengaging the first through fourth clutches C-1 to C4 and the first and second brakes B-1, B-2, and selectively connecting or fixing the input shaft 15, the output shaft 16, and the various elements of the speed reducing planetary gear set 20 and planetary gear set 21. In FIG. 2, the circles in the clutch and brake columns indicate that the clutch or brake is in an engaged state, and absence of a circle indicates a disengaged state.

Operation at each gear speed will now be described. When in P (parking) range or N (neutral) range, all of the clutches C-1 to C-4 and brakes B-1, B-2 are released, and therefore there is no power transfer between the input shaft 15 and output shaft 16.

In the first forward speed, as shown in FIG. 2, the first clutch C-1 and the one-way clutch F-1 are engaged. As a result, the reduced speed rotation of the ring gear R1 in the speed reducing planetary gear set 20 is input to the first sun gear S2 of the planetary gear set 21 via the first clutch C-1. The reduced speed rotation of the first sun gear S2 is then further reduced in speed via the carrier C2 (C3), the rotation of which is restricted to a single direction by the one-way clutch F-1, and input to the ring gear R2, whereby the output shaft 16 is positively rotated at a reduced speed corresponding to a first speed gear ratio. In engine braking, the second brake B-2 is engaged instead of the one-way clutch F-1 and the carrier C2 (C3) is held stationary.

In the second forward speed, the first clutch C-1 and the first brake B-1 are engaged. As a result, the reduced speed rotation of the ring gear R1 in the speed reducing planetary gear set 20 is input into the first sun gear S2 via the first clutch C-1, and since the second sun gear S3 is fixed by the first brake B-1, the ring gear R2 is positively rotated at a reduced speed corresponding to a second speed gear ratio, as is the output shaft 16.

In the third forward speed, the first and third clutches C-1, C-3 are engaged. As a result, the reduced speed rotation of the ring gear R1 in the speed reducing planetary gear 20 is input to the first sun gear S2 via the first clutch C-1 and input to the second sun gear S3 via the third clutch C-3. Accordingly, the planetary gear set 21 rotates integrally, and the ring gear R2, and therefore the output shaft 16, is positively rotated at a reduced speed corresponding to a third speed gear ratio.

In the fourth forward speed, the first and fourth clutches C-1, C-4 are engaged. As a result, the reduced speed rotation of the ring gear R1 in the speed reducing planetary gear set 20 is input to the first sun gear S2 via the first clutch C-1, and the rotation of the carrier C1 in the speed reducing planetary gear set 20 is input into the second sun gear S3 via the fourth clutch C-4. Thus, the ring gear R2 is positively rotated at a fourth speed gear ratio, as is the output shaft 16.

In the fifth forward speed, the first and second clutches C-1, C-2 are engaged. As a result, the reduced speed rotation of the ring gear R1 in the speed reducing planetary gear set 20 is input into the first sun gear S2 via the first clutch C-1, and the rotation of the input shaft 15 is input into the first and second carriers C2, C3, which are directly coupled via the second clutch C-2. Thus, the ring gear R2 is positively rotated at a reduced speed corresponding to a fifth speed gear ratio, as is the output shaft 16.

In the sixth forward speed, the second and fourth clutches C-2, C-4 are engaged. As a result, the rotation input to the input shaft 15 is input to the fourth clutch C-4 via the carrier C1 of the speed reducing planetary gear set 20, and the rotation is then input to the second sun gear S3. The rotation of the input shaft 15 is also input to the first and second carriers C2, C3, which are directly coupled via the second clutch C-2. Thus, the planetary gear set 21 rotates integrally with the input shaft 15, and the ring gear R2 is positively rotated at a speed corresponding to a sixth speed gear ratio, as is the output shaft 16.

In the seventh forward speed, the second and third clutches C-2, C-3 are engaged. As a result, the rotation of the input shaft 15 is input to the first and second carriers C2, C3, which are directly coupled via the second clutch C-2, and the reduced speed rotation of the ring gear R1 in the speed reducing planetary gear set 20 is input into the second sun gear S3 via the third clutch C-3. Thus, the ring gear R2 is positively rotated at an increased speed corresponding to a seventh speed gear ratio, as is the output shaft 16.

In the eighth forward speed, the second clutch C-2 and the first brake B-1 are engaged. As a result, the rotation of the input shaft 15 is input to the first and second carriers C2, C3, which are directly coupled via the second clutch C-2, and the second sun gear S3 is fixed by the first brake B-1. Thus, the ring gear R2 is positively rotated at an increased speed corresponding to an eighth speed gear ratio, as is the output shaft 16.

In the first reverse speed, the third clutch C-3 and the second brake B-2 are engaged. As a result, the rotation of the input shaft 15 is input to the second sun gear S3 via the third clutch C-3, and the directly coupled first and second carriers C2, C3 are fixed by the second brake B-2. Thus, the ring gear R2 is rotated in reverse at a reduced speed corresponding to a first reverse speed gear ratio, as is the output shaft 16.

In the second reverse speed, the fourth clutch C-4 and the second brake B-2 are engaged. As a result, the rotation of the input shaft 15 is input to the fourth clutch C-4 via the carrier C1 of the speed reducing planetary gear set 20 and the rotation is then input into the second sun gear S3, while the directly coupled first and second carriers C2, C3 are fixed by the second brake B-2. Thus, the ring gear R2 is rotated in reverse at a reduced speed corresponding to a second reverse speed gear ratio, as is the output shaft 16.

Figure 3:
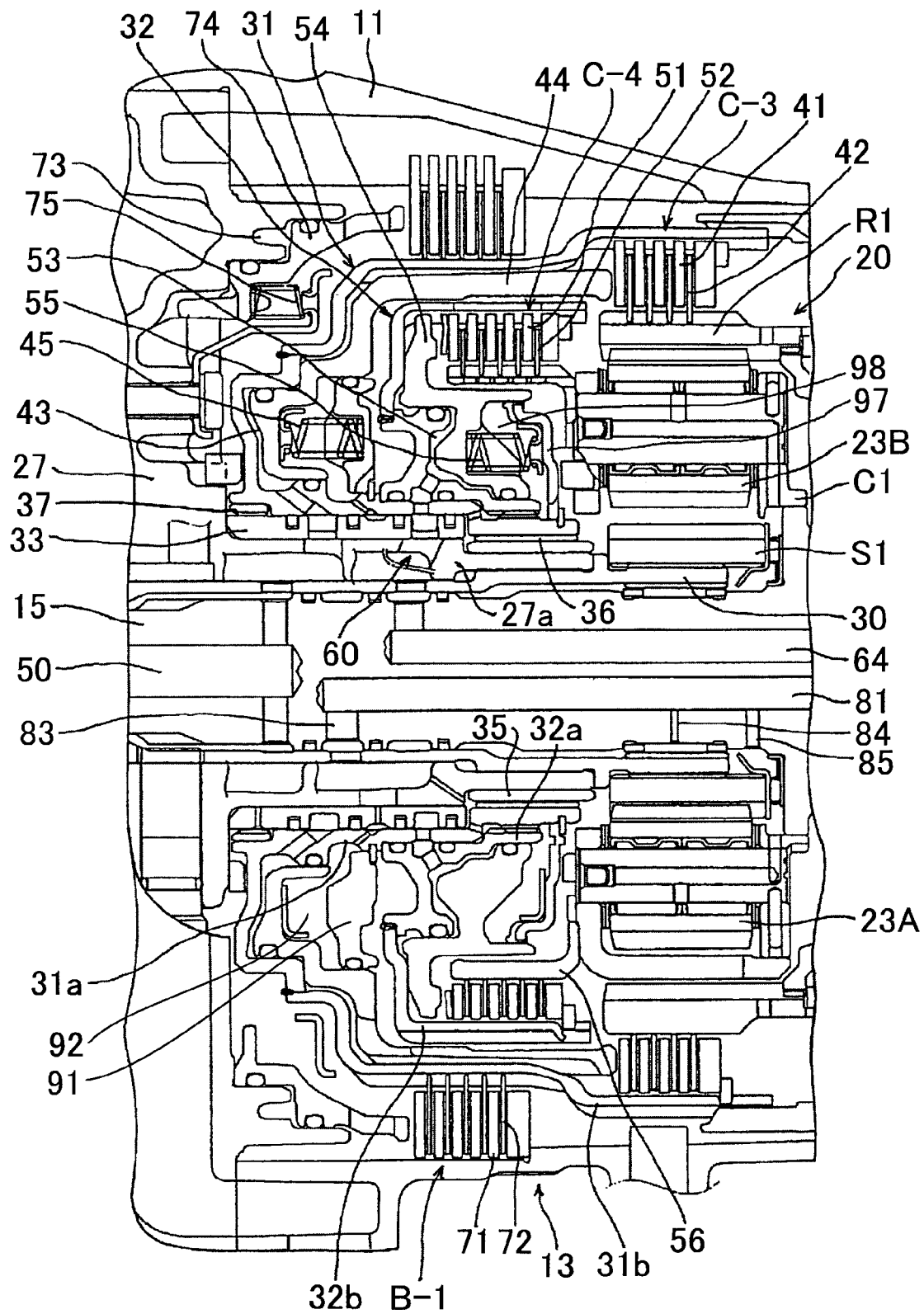
FIG. 3 is a sectional view of the automatic transmission according to an embodiment of the present invention showing the lubricating structure.
Figure 4:
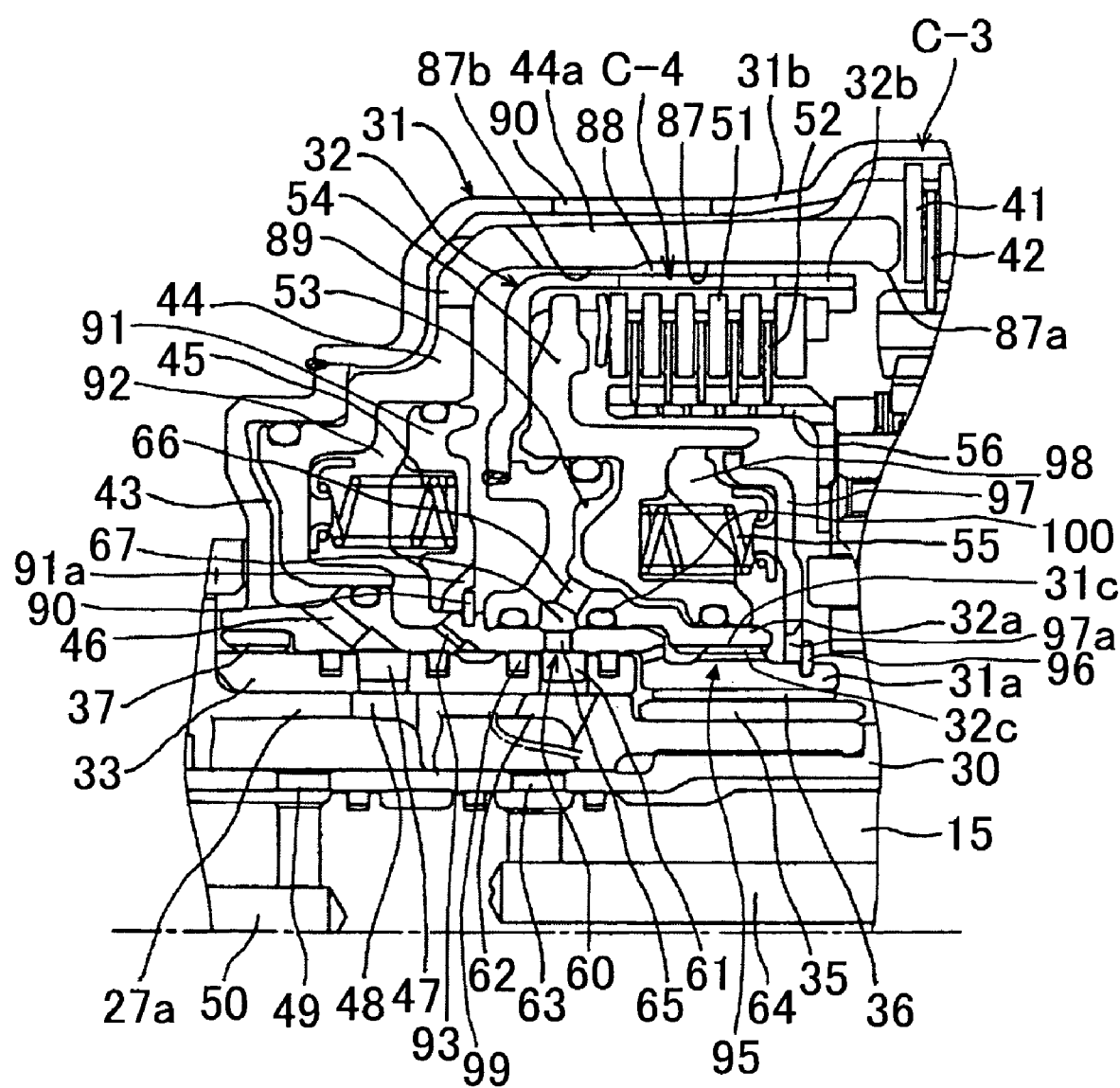
FIG. 4 is a partial enlargement of FIG. 3.

FIGS. 3 and 4 show the specific structure of the speed reducing planetary gear set 20, the third and fourth clutches C-3, C-4, and the first brake B-1. The input shaft 15 is rotatably supported by the transmission case 11, an oil pump body 27 fixed to the transmission case 11, and a stator shaft 30. The stator shaft 30 is press-fit into the interior of a boss portion 27a of the oil pump body 27. The speed reducing planetary gear set 20 is disposed radially outward of a rear end of the stator shaft 30, and the sun gear S1 of the speed reducing planetary gear set 20 is held against rotation by a splined engagement. The carrier C1 of the speed reducing planetary gear set 20 is joined to a flange portion of the input shaft 15 by welding for rotation integral with the input shaft 15. Further, the carrier C1 has a first pinion shaft and a second pinion shaft which rotatably support the first pinion 23A and the second pinion 23B, respectively. The ring gear R1 of the speed reducing planetary gear set 20 meshes with the second pinion 23B, and is rotated at a reduced speed by the input rotation of the input shaft 15. The ring gear R1 has a spline teeth on its outer surface for spline-engagement with friction plates 42 of the third clutch C-3. When the third clutch C-3 is engaged, the ring gear R1 transfers reduced speed rotation to a first drum 31.

Lubricating oil supplied through an oil hole 85 from a lubricating supply passage 81 formed in the input shaft 15 passes through a lubricating oil passage formed in the carrier C1 and a lubricating oil passage formed in the first pinion shaft and second pinion shaft for lubrication of the first pinion 23A and second pinion 23B. After lubricating the ring gear R1, the lubricating oil is supplied to friction engagement elements of the third clutch C-3.

The third clutch C-3 has the first drum 31 of a closed-end cylindrical shape, and the fourth clutch C-4 has a second drum 32, also having a closed-end cylindrical shape, are housed in the transmission case 11. The fourth clutch C4 is accommodated within the first drum 31. The first drum 31 is rotatably supported on the outer surface of a sleeve member 33 which is pressed onto the outer surface of the boss portion 27a of the oil pump body 27. The second drum 32 is supported by a boss 31a and extends coaxially within the first drum 31. Further, the second drum 32 is engaged with the first drum 31 by splined portion 95 for rotation integral therewith.

The inner portion of the first drum 31 is a boss 31a, which is rotatably supported on the outer surface of the sleeve member 33, and a plurality of sealing members are interposed between the inner surface of the boss 31a and the outer surface of the sleeve member 33. A rear end portion of the boss 31a of the first drum 31 is rotatably supported, via a metal bush-shaped main bearing 36, by a support sleeve 35 which is fitted onto the outer surface of the rear end of the boss 27a of the oil pump body 27. The main bearing 36 has a sufficient axial length to allow it alone to rotatably support the first drum 31.

A metal bush-shaped auxiliary bearing 37, having a shorter axial length than the main bearing 36 is press-fit into the interior of the boss 31a. The auxiliary bearing 37 surrounds the outer surface of the sleeve member 33 with a gap therebetween, and does not function as a bearing in normal operation. The auxiliary bearing 37 contacts the outer surface of the sleeve member 33 to function as a bearing only when an incline-related force such as a gyroscopic moment is applied to the first drum 31 such that the first drum 31 tilts to or beyond a predetermined angle of inclination relative to the central axis of the transmission.

The open (end portion) 31b of the first drum 31 is selectively connected to the ring gear R1 of the speed reducing planetary gear set 20 via the third clutch C-3. The third clutch C-3 is formed of friction engagement elements including separator plates 41, which are spline-engaged to the inner surface of cylindrical portion 31b of the first drum 31, and friction plates 42, which are splined to the ring gear R1, and a first hydraulic servo. The first hydraulic servo includes a first piston 44, which is slidably mounted within a first cylinder chamber 43 formed in the bottom portion of the first drum 31, a canceller plate 91 disposed on the boss portion 31a of the first drum 31, and a return spring 45 which biases the first piston 44 toward the bottom portion of the first drum 31.

An inner peripheral edge of the canceller plate 91 is latched around the outer surface of the boss 31a of the first drum 31 and movement thereof in one axial direction is limited by a snap ring 90. The outer peripheral edge of the canceller plate 91 is slidably sealed against the inner cylindrical surface of the first piston 44, and a first cancel chamber 92 is formed between the canceller plate 91 and the first piston 44. The return spring 45, which urges the first piston 44 in the axial direction disengaging the third clutch C-3, is disposed between the canceller plate 91 and first piston 44.

The first cancel chamber 92 is supplied with cancel oil (lubricating oil) through a radially-extending cancel oil supply hole 93 formed in the boss 27a of the oil pump body 27, the sleeve member 33, and the first drum 31. The cancel oil supplied to the first cancel chamber 92 is discharged to the outside through a cancel oil discharge groove 91a formed in the inner peripheral edge of the canceller plate 91. The first cancel chamber 92 acts to cancel centrifugal oil pressure generated in the first cylinder chamber 43.

The first piston 44 has a large diameter cylindrical (skirt) portion 44a which extends along the inner surface of the outer cylindrical portion 31b of the first drum 31, and the free end of the skirt portion 44a is positioned to engage (axially aligned with) the friction engagement elements of the third clutch C-3. The first cylinder chamber 43 of the hydraulic servo communicates with an oil passage formed in the boss 27a of the oil pump body 27 via a supply passage 47 which includes oil holes formed in the boss 31a of the first drum 31 and the sleeve member 33, respectively. The oil passage formed in the boss 27a is connected to an oil pressure control device, not shown in the drawings and, responsive to oil pressure supplied by the oil pressure control device, the first piston 44 slides against the spring force of the return spring 45 so as to engage the third clutch C-3. When the oil pressure is released, the third clutch C-3 is released by the spring force of the return spring 45.

The second drum 32 is disposed radially inward of both the large diameter cylindrical portion (skirt) 44a of the first piston 44 and the third clutch C-3. The second drum 32 includes an inner boss portion 32a, disposed coaxially within the boss 31a of the first drum 31, and an outer cylindrical portion 32b. As shown in FIG. 4, interior splines 32c are formed on the inner surface of the rear side end portion of the boss 32a and are engaged with outer splines 31c formed on the outer cylindrical surface of the front end portion of the boss 31a, and thus the second drum 32 rotates integrally with the first drum 31.

The open end side (rear side) of the outer cylindrical portion 32b of the second drum 32 is selectively connected to the carrier C1 of the speed reducing planetary gear set 20 via the fourth clutch C-4. The fourth clutch C-4 has friction engagement elements including separator plates 51, which are splined to the inner surface of the second drum cylindrical portion 32b, and friction plates 52, which are splined to the outer surface of a clutch hub 56 coupled to the carrier C1, and a second hydraulic servo. The second hydraulic servo has a second piston 54 slidably mounted in a second cylinder chamber 53 formed in the bottom portion of the second drum 32, a canceller plate 97 disposed on the boss 31a of the first drum 31, and a return spring 55 which biases the second piston 54 toward a position where the clutch C-4 is disengaged. The radially outer end (distal end) of the second piston 54 is splined to the inner surface of the cylindrical portion 32b of the second drum 32 and is disposed at the rear of the friction engagement elements of the fourth clutch C4. The second piston 54 is supported on the outer surface of the boss 32a of the second drum 32.

The canceller plate 97 is disposed on the outer surface of the rear end portion of the boss 31a, with movement thereof in one axial direction is limited by a snap ring 96. The outer peripheral edge of the canceller plate 97 is slidably engaged with the inner surface of the second piston 54, and a second cancel chamber 98 is formed between the canceller plate 97 and the second piston 54. The return spring 55, which axially urges the second piston 54 in a direction disengaging the fourth clutch C-4, is disposed between the canceller plate 97 and the second piston 54.

The third clutch C-3 is formed by the first drum 31, friction engagement elements including separator plates 41 and friction plates 42, the first cylinder chamber 43, the first piston 44, the return spring 45, and the hydraulic servo formed between the first drum 31 and the first piston 44. The friction engagement elements, the first piston 44, and the return spring 45 are housed within the first drum 31.

Similarly, the fourth clutch C-4 is formed by the second drum 32, the friction engagement elements including separator plates 51 and the friction plates 52, the second piston 54, the return spring 55, and the hydraulic servo formed by the second drum 32 and the second piston 54. The friction engagement elements, the second piston 54, and the return spring 55 are all housed within the second drum 32.

An oil pressure supply passage 60 is formed of a plurality of second working oil supply holes 65 extending radially through the boss 31a of the first drum 31 at circumferentially spaced, equiangular positions, a plurality of third working oil supply holes 66 extending radially through the boss 32a of the second drum 32 at circumferentially spaced, equiangular positions, and an annular oil passage 67 formed between the two bosses 31a, 32a. The second and third working oil supply holes 65, 66 communicate with each other via the annular oil passage 67. A pair of sealing rings 99 are disposed on the sleeve member 33 on axially opposed sides of the second working oil supply holes 65. Also, sealing rings (O rings) 100 are disposed on the boss 31a on axially opposed sides of the second and third working oil supply holes 65, so as to form the annular oil passage 67 therebetween.

The outer surface of the outer cylindrical portion 31b of the first drum 31 is selectively connected to the transmission case 11 by the first brake B-1. The first brake B-1 friction engagement elements including separator plates 71 which are splined to the inner surface of the transmission case 11 and friction plates 72 which are splined to the outer surface of the outer cylindrical portion 31b of the first drum 31, and a hydraulic servo. The hydraulic servo is formed by a piston 74, which is slidably mounted in an oil chamber 73 formed in the transmission case 11, and a return spring 75 which biases the piston 74 in a direction disengaging the brake B-1.

The tip end of the skirt of the piston 74 is axially aligned with the friction engagement elements of the first brake B-1, for pressing against those friction engagement elements for engagement of the first brake B-1. The oil chamber 73 of the hydraulic servo is connected to the oil pressure control device via an oil passage or the like, not shown in the drawing, formed in the transmission case 11, and, responsive to oil pressure supplied by the oil pressure control device, the piston 74 slides against the spring force of the return spring 75 so as to engage the first brake B-1. When the oil pressure against the piston 74 is released, the brake B-1 is released by the spring force of the return spring 75.

A lubricating oil supply passage 81 is formed in the input shaft 15, and lubricating oil is supplied by an oil pump to the supply passage 81 via the oil pressure control device and a supply hole 83. A plurality of rows of supply holes 84, 85 communicate with the supply passage 81, and the lubricating oil is supplied to the various areas in the interior of the transmission case 11 through these supply holes 84, 85. The lubricating oil supplied to the interior of the transmission case 11 is dispersed radially outward by centrifugal force, and thereby supplied to various operating elements including the speed reducing planetary gear set 20, the clutches C-3, C-4, the brake B-1, and the bearings.

Figure 5:
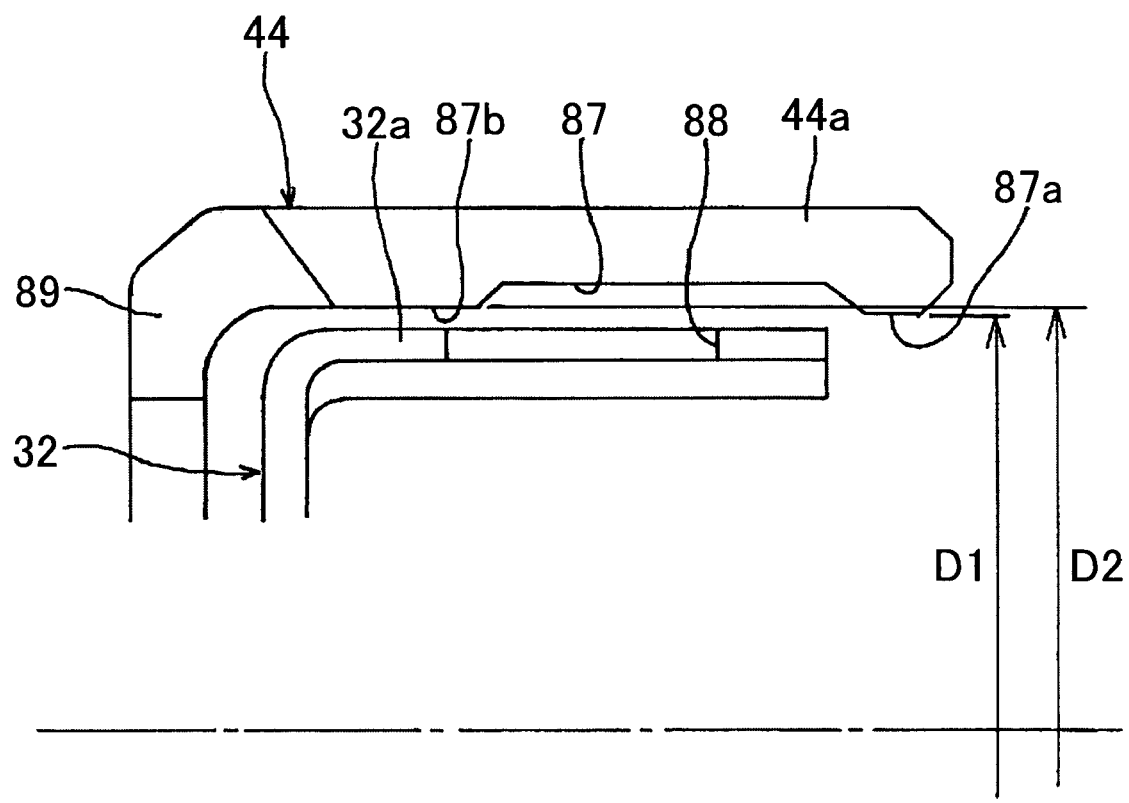
FIG. 5 is a partial view of an oil reservoir formed in a piston shown in FIG. 4.

As shown in detail in FIG. 5, an oil reservoir 87 in the shape of an annular groove is formed in the inner surface of the large diameter cylindrical portion 44a of the first piston 44 which operates the third clutch C-3. An opening 88 at least partially radially aligned with the oil reservoir 87 is formed in the outer cylindrical surface 32b of the second drum 32, and thus the lubricating oil that is supplied to the inner periphery of the friction engagement elements of the fourth clutch C4, flows through gaps between the friction engagement elements for lubrication thereof, flows through the opening 88 and is then collected in oil reservoir 87.

The oil reservoir 87 extends axially between barriers 87a and 87b having different diameters. More specifically, the inner diameter D1 of the opening side barrier 87a is smaller than the inner diameter D2 of the bottom side barrier 87b. In other words the opening side barrier 87a extends radially inward farther than does the bottom side barrier 87b. D2 is larger than D1 by ΔD. Thus, in normal operation, the lubricating oil which is supplied to and collected in the oil reservoir 87 by centrifugal force is prevented from flowing the opening side barrier 87a of the oil reservoir 87. Thus, the lubricating oil collected in the reservoir 87 is caused to flow toward the bottom side, over the bottom side barrier 87b. As a result, the lubricating oil is supplied to the friction engagement elements of the first brake B-1 through an opening 89 formed in the first piston 44 and an opening 90 formed in the outer cylindrical portion 31b of the first drum 31.

The amount of lubricating oil flowing into the oil reservoir 87 from the inner peripheral side of the friction engagement elements of the fourth clutch C-4 via the opening 88 in the clutch drum cylindrical portion 32b is reduced when the fourth clutch C-4 is engaged, and when the fourth clutch C-4 is disengaged, the amount of lubricating oil is increased such that more lubricating oil is supplied to the oil reservoir 87. The foregoing is due to the gaps between the friction engagement elements being reduced/eliminated when the fourth clutch C-4 is engaged, thus restricting the flow of the lubricating oil through the friction engagement elements. Hence, when the fourth clutch C-4 is disengaged, the amount of lubricating oil supplied to the oil reservoir 87 is increased, and as a result, lubricating oil overflows the opening side barrier 87a of the oil reservoir 87 (in addition to overflow of barrier 87b) and is thereby supplied to the third clutch C-3.

During an upshift of the automatic transmission, the rotational speed is absorbed by the engaged side clutches, and hence a large amount of heat is typically generated by the engaged side clutches. However, in the automatic transmission according to this embodiment, as is evident from the engagement table shown in FIG. 2, the third clutch C-3 and fourth clutch C4 are never engaged simultaneously. In other words, when the fourth clutch C4 is engaged, the third clutch C-3 is disengaged, and when the third clutch C-3 is engaged, the fourth clutch C-4 is disengaged. Here, the third clutch C-3 is only engaged in three shift speeds, namely the third speed, seventh speed, and first reverse speed. When an upshift is performed to the third speed, the fourth clutch C-4 is disengaged at the previous shift speed (first speed or second speed). Hence, a larger amount of lubricating oil is supplied to the oil reservoir 87 via the disengaged fourth clutch C-4, and as a result, a sufficient amount of lubricating oil is supplied to the third clutch C-3 via the opening side barrier 87a so that the third clutch C-3 can be cooled effectively. Therefore, when shifting to the third speed, at which time a comparatively large amount of heat may be generated, the third clutch C-3 is engaged after being sufficiently cooled by the lubricating oil, and as a result, the durability of the friction engagement elements of the third clutch C-3 is improved. When shifting to the first reverse speed, the first reverse speed is attained from a neutral state, and therefore, similar to the third speed, the third clutch C-3 can be sufficiently cooled.

It should be noted that lubricating oil is supplied to the third clutch C-3 from locations other than the oil reservoir 87. Hence, when the third clutch C-3 is engaged so as to generate a large amount of heat, lubricating oil is also supplied from the oil reservoir 87, and therefore a larger amount of lubricating oil is supplied thereto.

When performing an upshift to the seventh speed (shifting from the sixth to the seventh speed), the fourth clutch C-4 is engaged in the sixth speed, and therefore, the amount of lubricating oil flowing into the oil reservoir 87 via the opening 88 in the second clutch drum cylindrical portion 32b is relatively smaller immediately prior to engagement of the third clutch C-3. Accordingly, the lubricating oil flowing to the brake B-1 is prioritized, with a reduction in the amount of lubricating oil overflowing the opening side barrier 87a of the first piston 44.

Thus, the amount of lubricating oil supplied to the third clutch C-3 is temporarily insufficient immediately after the third clutch C-3 is engaged. However, this condition occurs only in shifting from the sixth forward speed to the seventh forward speed, as is evident from the engagement table shown in FIG. 2, and the amount of heat generated by the third clutch C-3 in attaining a comparatively high shift speed, such as the seventh speed, is small. Therefore, the third clutch C-3 can be cooled sufficiently by lubricating oil supplied from locations other than the oil reservoir 87, and hence no practical problem arises.

According to the embodiment described above, when the third clutch C-3 is engaged, the fourth clutch C-4 is disengaged, and therefore the amount of lubricating oil supplied to the oil reservoir 87 via the disengaged fourth clutch C-4 increases, causing lubricating oil to overflow the opening side barrier 87a and to be supplied to the third clutch C-3 in which a large amount of heat is generated. Accordingly, lubricating oil can be allocated accurately to the required clutch without increasing the overall flow rate of the lubricating oil.

Further, when the fourth clutch C-4 is engaged, the amount of lubricating oil supplied to the oil reservoir 87 via the fourth clutch C-4 decreases, and therefore lubricating oil stops overflowing the opening side barrier 87a of the oil reservoir 87 so that lubricating oil is supplied to the first brake B-1 past the bottom portion side barrier 87b. In this case, however, the third clutch C-3 is disengaged and does not require a large amount of lubricating oil, and hence no more than the required amount of lubricating oil is supplied.

Conventionally, a drum or the like which rotates at high speed, such as the second drum 32, may become deformed by centrifugal force tending to open the outer cylindrical portion radially outward, and therefore a sufficient clearance must be provided between it and a member located radially outward to prevent interference due to such deformation. In this embodiment, however, the oil reservoir 87 is formed at the radially outer side of the cylindrical portion of the second drum 32, and therefore serves as a clearance such that even if the cylindrical portion of the second drum 32 is deformed by centrifugal force, interference with the first piston 44 is prevented. Hence, the need to provide an additional, separate clearance is eliminated, and a more radially compact structure can be obtained.

While in the embodiment described above, the automatic transmission is capable of attaining gear ratios for eight forward speeds and two reverse speeds; however, the present invention is not so limited and may be applied to any automatic transmission in which lubricating oil is supplied via one clutch to another clutch.

Further, in the embodiment described above, the planetary gear set 21 is a Ravigneaux type gear set combining a single pinion planetary gear subset and a double pinion planetary gear subset, but the planetary gear set 21 of the present invention is not limited to a Ravigneaux type gear set, and any planetary gear set may be employed as long as it includes a plurality of (two or more) planetary gear subsets.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An automatic transmission, comprising:
 a speed change mechanism for shifting between a plurality of speeds by engaging and disengaging a plurality of clutches and brakes, the speed change mechanism comprising a first clutch having a first drum, first friction engagement elements disposed in the first drum, and a first piston which is slidably mounted on a boss portion of the first drum, the first piston and the first drum together forming a first cylinder chamber, the first piston engaging the first friction engagement elements of the first clutch responsive to oil pressure supplied to the first cylinder chamber, and a second clutch including a second drum accommodated within the first drum, second friction engagement elements disposed in the second drum, and a second piston which is slidably mounted on a boss portion of the second drum, the second piston and the second drum together forming a second cylinder chamber, the second piston engaging the second clutch responsive to oil pressure supplied to the second cylinder chamber;

a drain hole formed in the second drum for draining lubricating oil supplied to the second friction engagement elements, the drain hole being sized to limit the amount of drainage of the lubricating oil when the second clutch is engaged; and an oil reservoir, formed as an annular groove in an inner cylindrical surface of a skirt portion of the first piston, for receiving and storing the lubricating oil that is drained through the drain hole after lubricating the second clutch, the oil reservoir having a cylindrical section extending axially between a first barrier, at an axial side of the reservoir adjacent an open end of the skirt of the first piston, the first barrier having an inner diameter which is smaller than the inner diameter of the cylindrical section of the oil reservoir, and a second barrier axially spaced from the first barrier and having a larger inner diameter than the first barrier and smaller than the inner diameter of the cylindrical section of the oil reservoir; and wherein the first piston engages the first friction engagement elements at a location between an outer cylindrical portion of the first drum and an out cylindrical portion of the second drum, and wherein, when the second clutch is disengaged a larger amount of oil flows to the oil reservoir than when the second clutch is engaged, which larger amount causes lubricating oil to overflow the first barrier and flow to the first friction engagement elements.

2. The automatic transmission according to claim 1, additionally comprising a brake disposed on an outer cylindrical surface of the first drum, and wherein the lubricating oil is supplied to the brake from the oil reservoir, over the second barrier and through openings formed in the first piston and the first drum.

3. The automatic transmission according to claim 1, wherein the first clutch is engaged at a predetermined low shift speed and at a predetermined high shift speed, and the second clutch is disengaged when shifting to the predetermined low shift speed and engaged when shifting to the predetermined high shift speed.

4. The automatic transmission according to claim 2, wherein the first clutch is engaged at a predetermined low shift speed and at a predetermined high shift speed, and the second clutch is disengaged when shifting to the predetermined low shift speed and engaged when shifting to the predetermined high shift speed.

5. An automatic transmission according to claim 1, wherein:
the speed change mechanism comprises a planetary gear set,
the planetary gear set comprises a ring gear located radially inward of the first friction engagement elements; and
lubricating oil is supplied to the ring gear for lubrication and, after lubrication of the ring gear, is then supplied to the first friction engagement elements for lubrication.

6. An automatic transmission according to claim 2, wherein:
the speed change mechanism comprises a planetary gear set,
the planetary gear set comprises a ring gear located radially inward of the first friction engagement elements; and
lubricating oil is supplied to the ring gear for lubrication and, after lubrication of the ring gear, is then supplied to the first friction engagement elements for lubrication.

7. An automatic transmission according to claim 3, wherein:
the speed change mechanism comprises a planetary gear set,
the planetary gear set comprises a ring gear located radially inward of the first friction engagement elements; and
lubricating oil is supplied to the ring gear for lubrication and, after lubrication of the ring gear, is then supplied to the first friction engagement elements for lubrication.

8. An automatic transmission according to claim 4, wherein:
the speed change mechanism comprises a planetary gear set,
the planetary gear set comprises a ring gear located radially inward of the first friction engagement elements; and
lubricating oil is supplied to the ring gear for lubrication and, after lubrication of the ring gear, is then supplied to the first friction engagement elements for lubrication.

9. An automatic transmission according to claim 1 wherein the cylindrical of the oil reservoir, the first barrier and the second barrier are all coaxial cylindrical sections of the skirt portion of the first piston.

10. An automatic transmission according to claim 9 wherein the skirt portion of the first piston has an opening extending therethrough and wherein the second barrier is located intermediate the opening in the skirt portion and the oil reservoir.

11. An automatic transmission according to claim 1 wherein the skirt portion of the first piston has an opening extending therethrough and wherein the second barrier is located intermediate the opening in the skirt portion and the oil reservoir.

* * * * *

UNITED STATES PATENT AND TRADEMARK OFFICE
CERTIFICATE OF CORRECTION

PATENT NO.         : 7,604,558 B2                                    Page 1 of 1
APPLICATION NO.    : 11/600053
DATED              : October 20, 2009
INVENTOR(S)        : Okada et al.

It is certified that error appears in the above-identified patent and that said Letters Patent is hereby corrected as shown below:

On the title page, item (75) should read:

-- Inventors: Naoya Okada, Anjo (Japan); Katsuhisa Ishii, Okazakishi (Japan); Minoru Todo, Takahama (Japan); Hirofumi Ota, Toyota (Japan); Kazutoshi Nozaki, Togo-cho (Japan); Atsushi Honda, Setoshi (Japan) --.

Title page, item (73) should read:

-- Assignees: Aisin AW Co., Ltd. (JP); Toyota Jidosha Kabushiki Kaisha (JP) --.

On the Title Page:

The first or sole Notice should read --

Subject to any disclaimer, the term of this patent is extended or adjusted under 35 U.S.C. 154(b) by 257 days.

Column 11, line 27 "out" should read -- outer --.

Signed and Sealed this
Fourth Day of January, 2011

David J. Kappos
*Director of the United States Patent and Trademark Office*